(12) United States Patent
Hori

(10) Patent No.: US 11,157,221 B2
(45) Date of Patent: Oct. 26, 2021

(54) CONTROL APPARATUS, CONTROL METHOD, AND STORAGE MEDIUM FOR DISPLAYING A PREVIEW SCREEN

(71) Applicant: CANON KABUSHIKI KAISHA, Tokyo (JP)

(72) Inventor: Daisuke Hori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/414,243

(22) Filed: May 16, 2019

(65) Prior Publication Data

US 2019/0361649 A1 Nov. 28, 2019

(30) Foreign Application Priority Data

May 24, 2018 (JP) .............................. JP2018-099928

(51) Int. Cl.
*G06F 3/12* (2006.01)
*H04N 1/00* (2006.01)

(52) U.S. Cl.
CPC .......... *G06F 3/1254* (2013.01); *G06F 3/1204* (2013.01); *G06F 3/1205* (2013.01); *G06F 3/1206* (2013.01); *G06F 3/1243* (2013.01); *G06F 3/1257* (2013.01); *H04N 1/0044* (2013.01); *H04N 1/0071* (2013.01)

(58) Field of Classification Search
CPC ............. H04N 1/0044; H04N 1/00442; H04N 1/00458
See application file for complete search history.

(56) References Cited

U.S. PATENT DOCUMENTS

| 9,274,728 | B2 | 3/2016 | Hori | |
|---|---|---|---|---|
| 2002/0175958 | A1* | 11/2002 | Natori | ..................... G06K 15/02 |
| | | | | 347/5 |
| 2003/0020956 | A1* | 1/2003 | Goel | ...................... G06K 15/02 |
| | | | | 358/1.18 |
| 2011/0242559 | A1* | 10/2011 | Takeuchi | ............. H04N 1/2307 |
| | | | | 358/1.9 |
| 2014/0092424 | A1* | 4/2014 | Grosz | ................. G06F 3/04845 |
| | | | | 358/1.15 |
| 2015/0212771 | A1* | 7/2015 | Hori | ....................... G06F 3/1242 |
| | | | | 358/1.18 |
| 2015/0213339 | A1* | 7/2015 | Sawada | ..................... G06F 3/12 |
| | | | | 358/1.15 |

FOREIGN PATENT DOCUMENTS

JP 2015-138505 A 7/2015

* cited by examiner

*Primary Examiner* — Benjamin O Dulaney
(74) *Attorney, Agent, or Firm* — Venable LLP

(57) ABSTRACT

Implemented are a control apparatus, a control method, and a storage medium that enable efficient setting of poster printing. To this end, a control apparatus of the present invention is a control apparatus that allows a printing apparatus to print multiple divided images, into which an input image is divided, on print media, including: a setting unit that sets the number of divisions of the input image based on user input; an obtaining unit that obtains a width of the print media; a determining unit that determines a print region width of each of the divided images based on at least the set number of divisions and the width of the print medium; and a display control unit that displays guide information indicating a dividing position on a preview screen of the input image based on at least the determined print region width of the divided image.

17 Claims, 11 Drawing Sheets

CONTROL APPARATUS, CONTROL METHOD, AND STORAGE MEDIUM FOR DISPLAYING A PREVIEW SCREEN

BACKGROUND OF THE INVENTION

Field of the Invention

The present invention relates to a control apparatus and a control method that control printing an image dividedly on multiple print media, and a storage medium for executing the control method.

Description of the Related Art

There has been a technique called poster printing for printing an image dividedly on multiple print media. Japanese Patent Laid-Open No. 2015-138505 discloses that, for the printing of an image dividedly on multiple print media, the number of divisions of the image is calculated based on the image size and the sheet size of each print medium. The patent literature further discloses that a line for checking a dividing position is displayed on a print preview of the image based on the calculated number of divisions.

In Japanese Patent Laid-Open No. 2015-138505, the line for checking the dividing position is displayed on the print preview; however, since the patent literature primarily intends to print the image in the same scale, the displayed dividing position is based on the number of divisions that is determined based on the width of the image and the width of the print medium. This may form unnecessary white spaces.

SUMMARY OF THE INVENTION

Thus, the present invention provides a technique that enables efficient setting of poster printing.

To this end, a control apparatus of the present invention is a control apparatus that allows a printing apparatus to print multiple divided images, into which an input image is divided, on print media, including: a setting unit that sets the number of divisions of the input image based on user input; an obtaining unit that obtains a width of the print media; a determining unit that determines a print region width of each of the divided images based on at least the set number of divisions and the width of the print medium; and a display control unit that displays guide information indicating a dividing position on a preview screen of the input image based on at least the determined print region width of the divided image.

According to the present invention, it is possible to implement a control apparatus, a control method, and a storage medium that enable efficient setting of poster printing.

Further features of the present invention will become apparent from the following description of exemplary embodiments with reference to the attached drawings.

DESCRIPTION OF THE EMBODIMENTS

First Embodiment

A first embodiment of the present invention is described below with reference to the drawings. Hereinafter, an embodiment of a computer system that uses layout software and a printer driver to perform poster printing of an image based on drawing data generated by a general application on a roll paper is described with reference to the drawings. The following embodiment is not intended to limit the present invention according to the scope of claims, and not all the combinations of features described in this embodiment are necessarily be required for the solution of the present invention.

Figure 1:
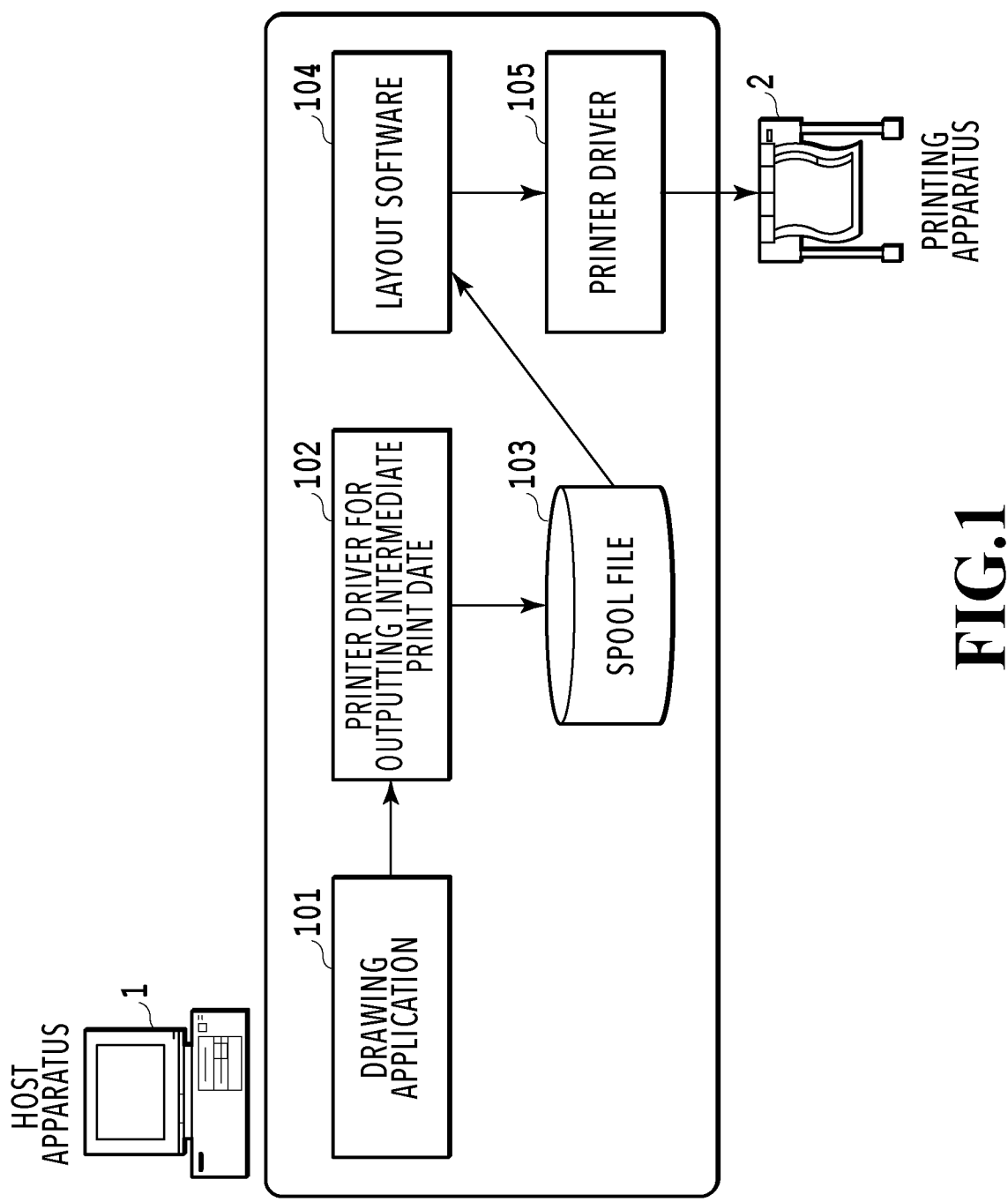
FIG. 1 is a diagram that illustrates a printing system.

FIG. 1 is a diagram that illustrates a printing system 100 to which this embodiment is applicable. The printing system 100 includes a host apparatus 1 and a printing apparatus 2. The host apparatus 1 is an apparatus such as a personal computer and is installed with a general drawing application 101 that can generate drawing data, printer drivers 102 and 105, and layout software 104. The printer driver for outputting intermediate print data 102 is a printer driver that outputs intermediate print data as a spool file 103.

In a case of printing with the printing system 100, once a user creates the drawing data with the drawing application 101 and then selects the printer driver for outputting intermediate print data 102, a print request is outputted. In response to the print request, the spool file 103 is outputted as intermediate print data in a predetermined format. The spool file 103 may be outputted to anywhere, such as Temp folder and AppData, which is not particularly limited as long as the later-described layout software 104 can read the spool file 103. The format of the spool file 103 may be XML paper specification (XPS) or enhanced metafile (EMF); however, the format may be any kind as long as the layout software 104 can process the spool file 103.

The layout software 104 is software for performing the poster printing, which reads the spool file 103, displays a preview based on the spool file 103, performs setting of the poster printing, and outputs data to the printer driver 105. The layout software 104 may be run by using resident software that monitors the print request to the printer driver for outputting intermediate print data 102 and runs the layout software 104 at the timing of the print request. In addition, the layout software 104 may be run automatically by monitoring output of the spool file 103, or may be run directly by the printer driver for outputting intermediate print data 102, for example.

The printer driver 105 is a general printer driver that forwards print data to the printing apparatus 2. The layout software 104 outputs the intermediate print data to the printer driver 105, and the printer driver 105 generates the print data based on the intermediate print data. The generated print data is transmitted to the printing apparatus 2, and the printing is performed. The printer drivers 102 and 105 may be an integrated single printer driver having a configuration in which the processing can be internally switched.

Thus, with the above-described configuration in which the layout software 104 obtains and edits the intermediate print data, it is possible to perform setting of the poster printing of various formats of data generated by drawing applications such as Microsoft Excel (registered trademark) and Auto-CAD (registered trademark) while checking an actual image. That is, with a configuration in which the drawing data is converted to the format of the intermediate print data (e.g., XPS format) and the intermediate print data is inputted to the layout software 104, the layout software 104 can make the print preview using the image based on the drawing data.

In this embodiment, the layout software 104 and the printer driver for outputting intermediate print data 102 can be distributed separately from the printer driver 105. This allows a vendor of printers to release the layout software 104 independently from the printer driver 105.

Figure 2:
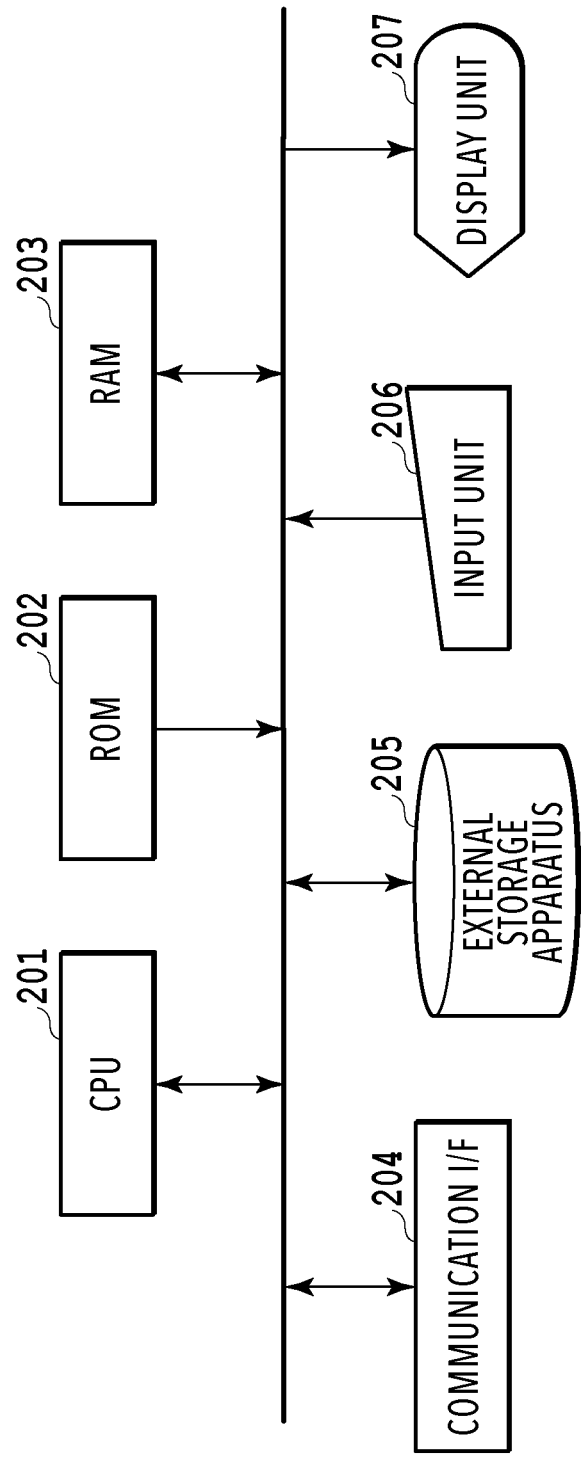
FIG. 2 is a block diagram that illustrates a configuration of a host apparatus.

FIG. 2 is a block diagram that illustrates a configuration of the host apparatus 1. In the host apparatus 1, a CPU 201 as a central processing apparatus, a ROM 202 and a RAM 203 as storage apparatuses, a communication interface 204, an external storage apparatus 205, an input unit 206 such as a mouse and keyboard, and a display unit 207 such as a CRT and LCD are connected to each other via a bus line. The CPU 201 controls the entirety of the host apparatus 1. The ROM 202 stores an initialization program and various kinds of data executed by the CPU 201 at start-up of the host apparatus 1. The RAM 203 is used as a main memory and work space of the CPU 201. The external storage apparatus 205 is made of a hard disk (HDD) and the like and stores the drawing application 101, printer drivers 102 and 105, layout software 104, and various other programs, for example.

The program stored in the external storage apparatus 205 is loaded from the external storage apparatus 205 to be stored in the RAM 203. The user inputs various instructions to the CPU 201 through the input unit 206 such as a keyboard and mouse (user input). The display unit 207 displays various items under control of the CPU 201 (display control). The host apparatus 1 communicates with peripheral apparatuses such as the printing apparatus 2 through the communication interface 204.

Figure 3:
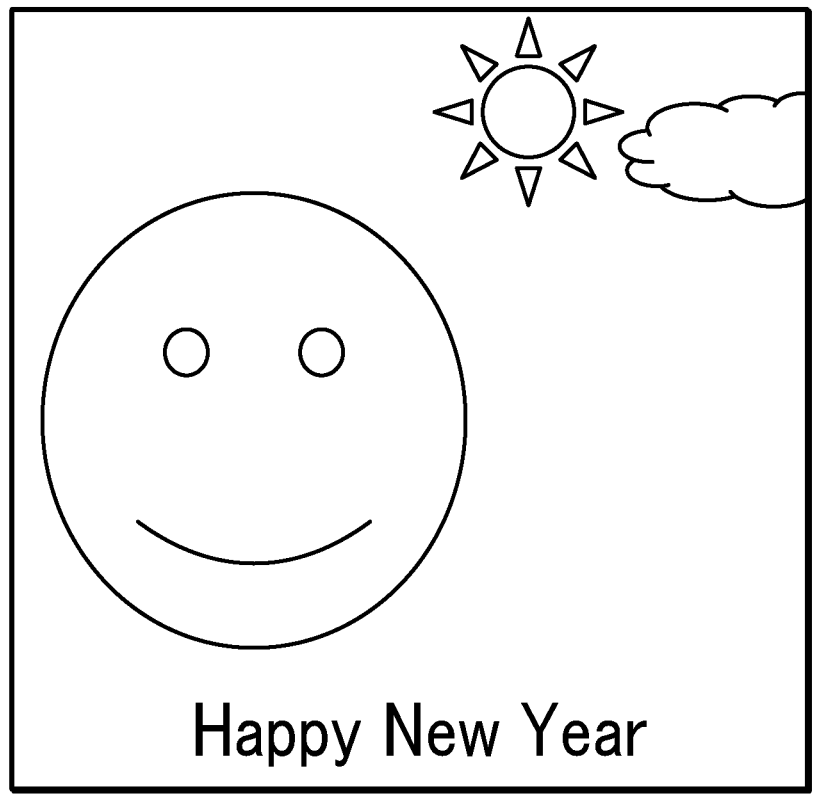
FIG. 3 is a diagram that illustrates an example of an outputted spool file.

FIG. 3 is a schematic diagram that illustrates an example of the spool file 103. The spool file 103 is the intermediate print data (in predetermined format) based on the drawing data generated by the drawing application 101. In the flow of generating the spool file 103, the drawing application 101 generates the drawing data first, and then the printer driver for outputting intermediate print data 102 is selected from a setting screen provided by the drawing application 101. Thereafter, in response to a print instruction from the user through the screen provided by the drawing application 101, the drawing application 101 outputs the print request. In response to the print request, the selected printer driver for outputting intermediate print data 102 generates the spool file 103 based on the drawing data generated by the drawing application 101.

Figure 4:
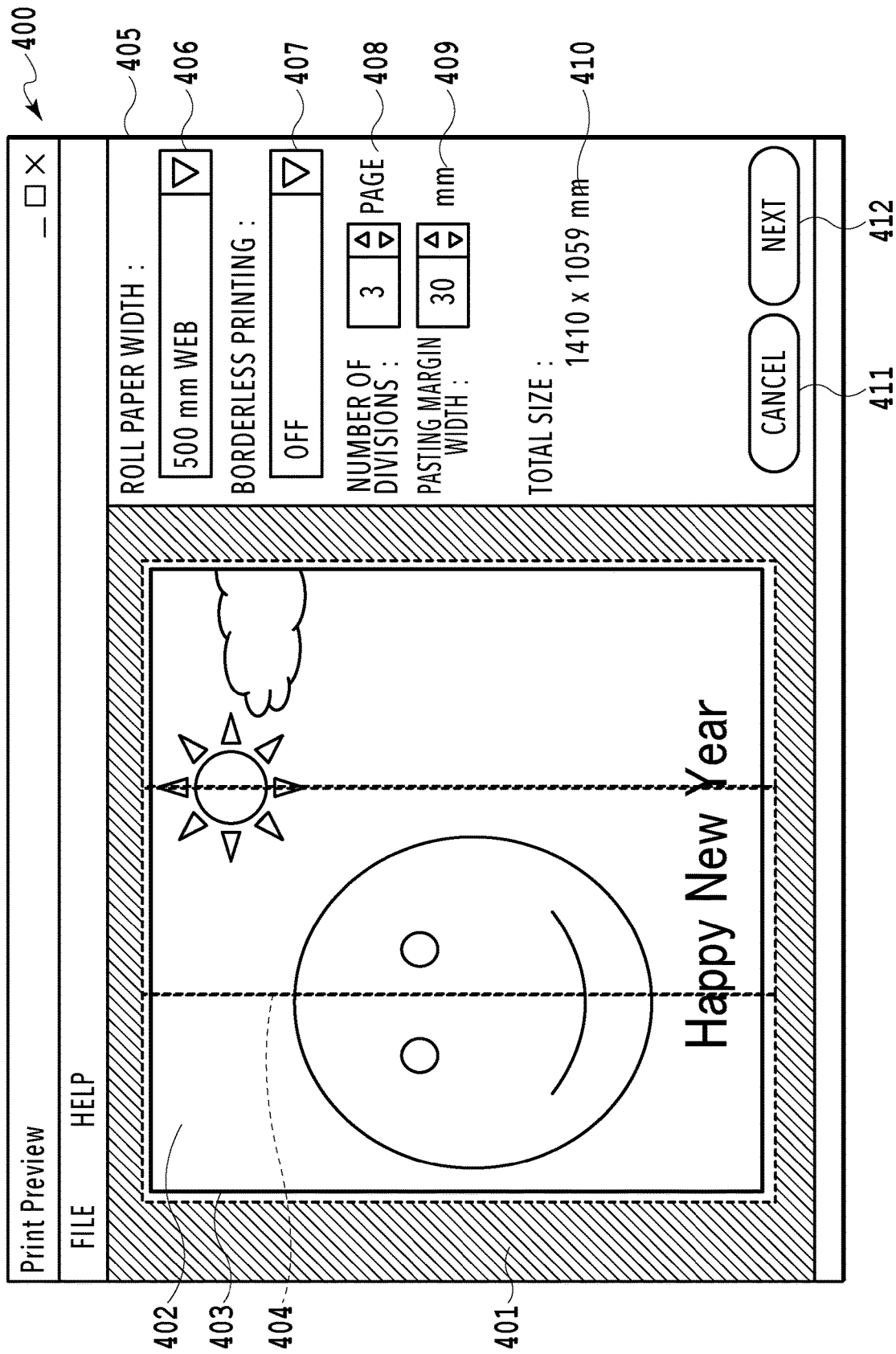
FIG. 4 is a diagram that illustrates an example of a UI screen of layout software.

FIG. 4 is a diagram that illustrates an example of a UI screen 400 of the layout software 104. The UI screen 400 (first display screen) is a screen for performing setting of image editing (editing setting screen). The layout software 104 obtains the spool file illustrated in FIG. 3 and then displays the obtained spool file as an input image for a preview screen on the screen to accept setting of image editing. Since the preview screen displays the input image on an image representing a sheet, it is possible to readily imagine the print result (how will the input image be printed on the sheet). In the following descriptions, a method of dividing the input image into multiple images and respectively printing the multiple divided images on multiple sheets may be referred to as the poster printing. The input image is also referred to as a poster image.

The UI screen 400 includes a region 401 as a display region for the user to check a result of the poster printing, a region 402 as a display region of the input image, a region 403 indicating a margin region set in the printing apparatus, and a dividing line 404 as a line dividing the poster image. The input image as the poster image is displayed in the region 402, and the margin region 403 set in the printing apparatus is displayed on the periphery of the region 402. The dividing line 404 is a line displayed in accordance with the editing which is set through the later-described region 405 and is a displayed item as a guide indicating the dividing position for dividing the input image into multiple pages in the case of the poster printing.

The region 405 is a region (editing setting region) that displays control items for the user to perform setting of the poster printing, and the region 405 includes a roll paper width setting item 406, a borderless printing setting item 407, a number of poster divisions setting item 408, a pasting margin width setting item 409, and a poster total size display region 410. The roll paper width setting item 406 (medium width setting item) is a combo box for setting the roll paper width to allow the user to set the width of the roll paper used for the printing. The borderless printing setting item 407 is a combo box for setting whether to perform "borderless printing" in which no white spaces are formed on the periphery of the sheet, and this allows the user to select on or off for setting whether to perform the borderless printing (whether to enable or disable setting of the borderless printing).

The number of poster divisions setting item 408 is a spin box for setting (or a spin box that enables setting of) the number of divisions of the poster image, that is, the number of the sheets used for the poster printing. As described above, this embodiment allows the user to arbitrary select the number of the sheets. In other words, the user can select the number of divisions of the input image (the number of the sheets on which the printing is made). Based on at least the set number of divisions and sheet width, a print region of each of the divided images is obtained. This can avoid appearance of unnecessary white spaces. Since the roll paper is used for the printing in this embodiment, the number of the sheets means the number of sheets cut out from the roll paper. For example, in a case where the input image is divided into three as illustrated in FIG. 4, the divided images are numbered as page 1, page 2, and page 3 in the order from the left and are printed page by page on the roll paper.

The pasting margin width setting item 409 is a spin box for setting a width of a pasting margin required for pasting the sheets of adjacent images among the multiple sheets on which the divided images are printed. Setting of the pasting margin width may not be provided and the width may be a fixed value; however, if the pasting margin width is adjustable like this case, the user can enhance the strength of the pasting of the posters or can make fine adjustment of the dividing position of the input image and the total size of the poster after pasting.

The poster total size display region 410 is a region that displays (or can display) an estimate value of the total size of the images on the pasted pages on which the input image is dividedly printed by the poster printing. The value of the total size is calculated according to the later-described flowchart in FIG. 10. The user thus can know the accurate entire size of the printed poster image before the printing, and it is possible to avoid a case such as a print result where the size of the poster is different from the size desired by the user.

A cancel button 411 and a next button 412 are provided on a bottom part of the region 405. In a case where the user wants to cancel the printing, the user can cancel the printing by pressing the cancel button 411. In a case where the setting of image editing is all completed, the user can move on to the next screen (see later-described FIG. 5) by pressing the next button 412.

As described above, the UI screen 400 displays the setting screen for setting of editing and the preview screen displaying an image reflecting the settings on the same screen.

Figure 5:
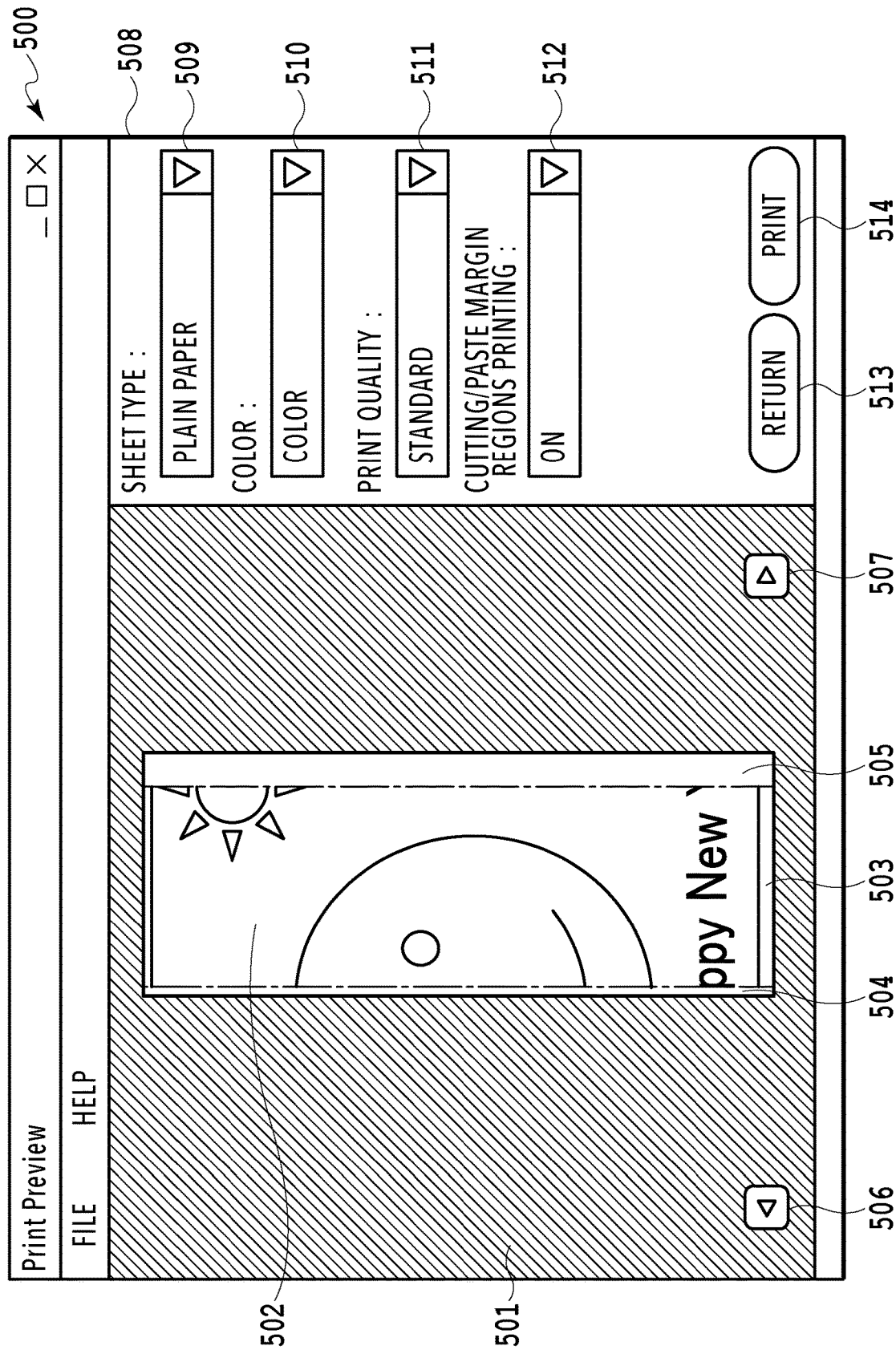
FIG. 5 illustrates a screen switched from the UI screen in FIG. 4 in a case where a next button is pressed.

FIG. 5 is a UI screen 500 of the layout software 104 and is a screen displayed in a case where the next button 412 is pressed and the screen is switched from the UI screen 400 in FIG. 4. The UI screen in FIG. 5 (second display screen) includes a region displaying each of the divided images reflecting the editing set though the UI screen in FIG. 4 and a region for setting of printing of the image (print setting region). The region displaying the image displays the divided images individually as a preview screen in accordance with the editing set through the UI screen in FIG. 4 to show how will the divided images be printed. The region for setting of printing displays displayed items for accepting setting of printing and execution of printing from the user.

In specific, the UI screen 500 includes a region 501 as a display region for the user to check images of the divided images individually, a region 502 displaying only an image that is divided from the input image and to be printed, and a region 503 indicating the margin region set in the printing apparatus. In this case, the region 503 uses the same margin value as the above-described margin region 403.

The UI screen 500 further includes a region 504 as a cutting region, a region 505 as a pasting margin region, and buttons 506 and 507 as page transition buttons. A region 508 as a region for various print settings is provided on the right of the region 501 of the UI screen 500. The region 508 includes an item 509 that is a combo box for setting a type of the sheet, an item 510 that is a combo box for setting color (color setting item), and an item 511 that is a combo box for setting print quality. The region 508 further includes an item 512 that is a combo box for setting printing of the cutting region and pasting margin region. A button 513 for going back to the previous screen (UI screen 400) and a button 514 for executing the printing are provided on a bottom part of the region 508.

The cutting region 504 is a region provided in a case where the borderless printing setting 407 is off (i.e., case of bordered printing), and all the pages except the first page (that is a page corresponding to a divided image on the left among the three divided images in FIG. 4) are provided with the cutting regions 504. The cutting region 504 is arranged on a left side of the display region 502 of the image.

All the pages except the last page (that is a page corresponding to a divided image on the right among the three divided images in FIG. 4) are provided with the pasting margin regions 505. The pasting margin region 505 is arranged on a right side of the display region 502 of the image. In the case of the bordered printing, the user can combine the sheets with no white spaces between the pages by cutting out the cutting regions 504 with a cutter and the like and then pasting the sheet to the pasting margin region 505 of the previous page.

In this embodiment, the width of the cutting region 504 is a fixed value, and only the width of the pasting margin region 505 is the value set in the pasting margin width setting item 409; however, these values both may be fixed values or values that are variable depending on the poster size and are not intended to particularly limit the present invention. Needless to say, the cutting region 504 and the pasting margin region 505 may be arranged opposite. The width of the cutting region 504 may be the same as the margin width set in the printing apparatus, or the left end may have no margin with no region 504 provided.

The button 506 is for switching the screen from the currently displayed page to the previous page by being pressed, and the button 507 is for switching the screen from the currently displayed page to the next page by being pressed. The item 509 (medium type setting item) is a combo box for setting the type of the sheet to allow the user to set the type of the sheet used for the printing. The options of the type of the sheet can be obtained from the printer driver 105 using an API such as PrintCapabilities. The item 510 is a combo box for setting the color used for the printing to allow the user to select color, monochrome, or the like.

The item 511 (print quality setting item) is a combo box for setting the print quality, and speed and quality of the printing are determined depending on the set quality. The options of the print quality can be obtained from the printer driver 105 using an API such as PrintCapabilities. The item 512 (region setting item) is for setting on or off of printing of the cutting region and the pasting margin region. In a case where this setting is on, boundaries of the region 504 as the cutting region and the region 505 as the pasting margin region and texts indicating the regions are added to the print data before the printing. On or off of this setting is reflected to the displayed regions 504 and 505.

The button 513 is for going back to the UI screen 400 by being pressed in a case where the user wants to go back to the UI screen 400 in FIG. 4. The button 514 is for executing the printing by being pressed in a case of executing the printing after all the print settings are completed. Once the button 514 is pressed, the layout software 104 divides the input image according to the settings and outputs the divided images to the printer driver 105. In this process, the print settings of the borderless printing setting item 407 and items 509 to 511 are reflected as the print setting information.

As described above, the UI screen 500 displays the setting screen for setting of printing and the preview screen displaying an image reflecting the settings on the same screen.

In this embodiment, a field for designating the printer driver 105 is not provided; however, the printer driver 105 may be designated on the screen of the layout software 104 and may be designated by a user interface (UI) of the printer driver for outputting intermediate print data 102. Otherwise, in a case where the printer driver for outputting intermediate print data 102 and the printer driver 105 are integrated as the same module, there is no need of providing a place for designating the printer driver 105. These configurations are not intended to particularly limit the present invention.

As described above, this embodiment allows the user to set the number of divisions of the image. Thus, the layout software 104 can obtain the width of the print region of each divided image based on at least the set number of divisions and sheet width. Once the width of the print region of the divided image is obtained, the dividing position of the image can be obtained. This makes it possible to display the guide information indicating the dividing position on the print preview screen of the input image. In addition, in this embodiment, since the width of the print region of the divided image is obtained based on the set number of divisions and sheet width, it is possible to efficiently perform setting of the print region without forming unnecessary white spaces on the sheet supplied to the printing apparatus.

The layout software 104 can display the UI screen displaying an image of the entire image with the dividing position by the preview function (see FIG. 4) and the UI screen individually displaying the divided images by the preview function (see FIG. 5). In addition, the UI screens 400 and 500 of the layout software 104 can be displayed with the setting screens for setting of printing. The UI screen 400 and the UI screen 500 can be switched alternatively. Accordingly, the user can perform the setting of editing and setting of printing while checking the dividing state and pasting margin position of the image to be printed through the preview screen provided by the layout software 104 without displaying the screen provided by the printer driver again.

Figure 6:
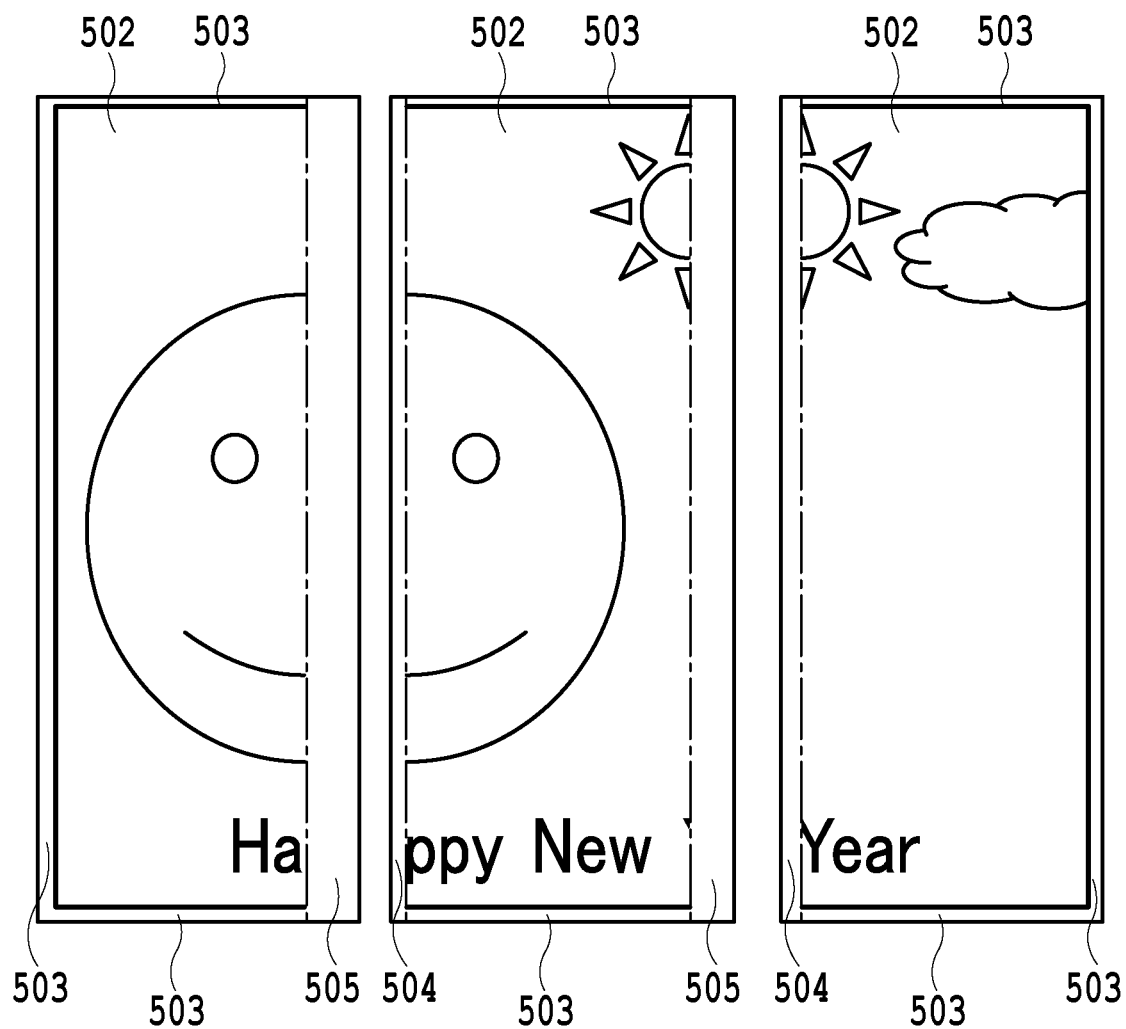
FIG. 6 illustrates a diagram that illustrates divided images including pasting margin regions and cutting regions.

FIG. 6 is a schematic diagram that illustrates a print result. In this case, the illustrated print result is from a case with the settings in FIG. 4 in which the borderless printing setting is set to off and the number of divisions is set to 3. In this case, the printing apparatus margin regions are provided on a left side of the image of the first page and a right side of the image of the last page. The cutting regions are provided on all the pages except the first page. The pasting margin regions are provided on all the pages except the last page.

Figure 7:
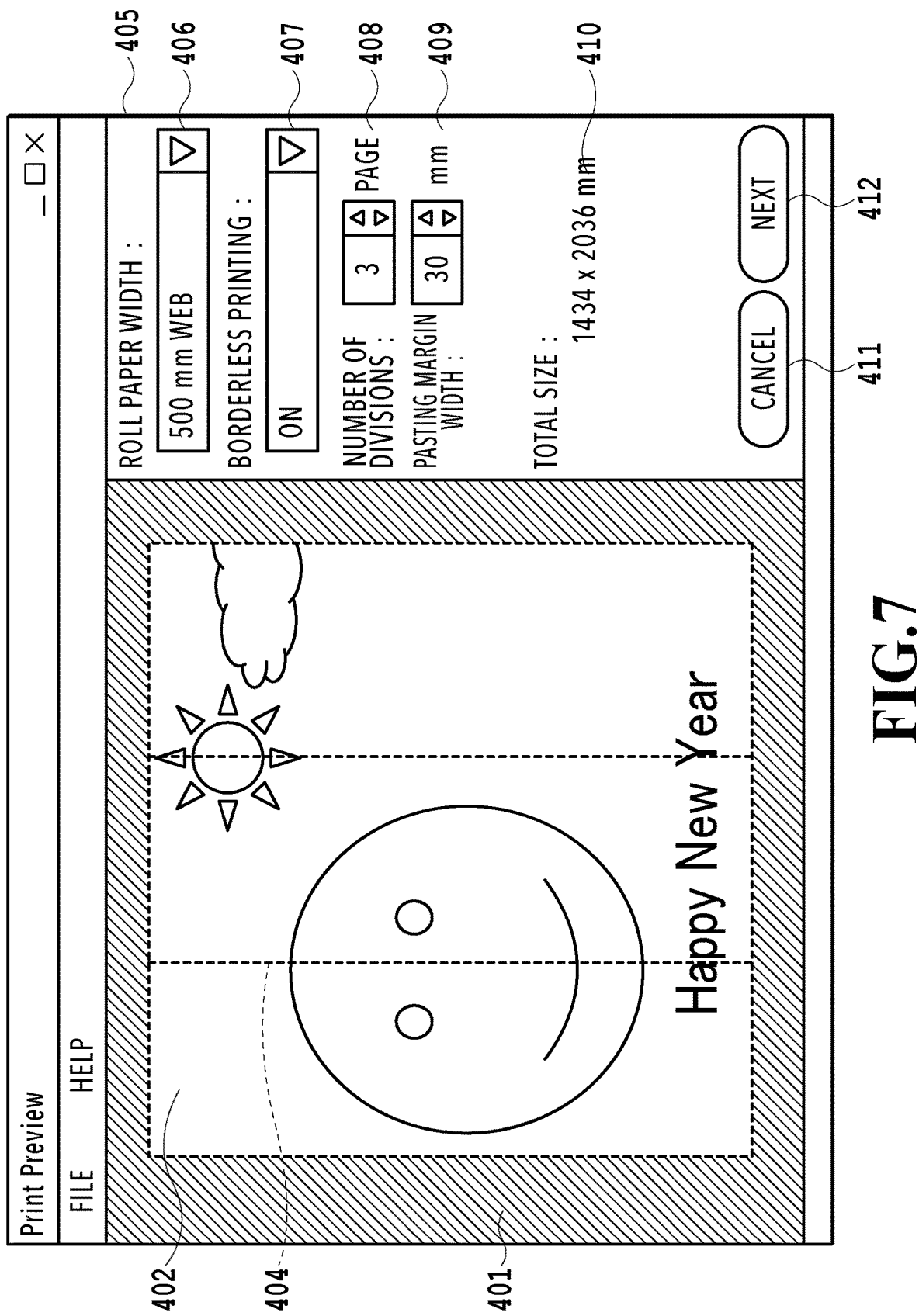
FIG. 7 illustrates a diagram that illustrates an example of the UI screen of the layout software.
Figure 8:
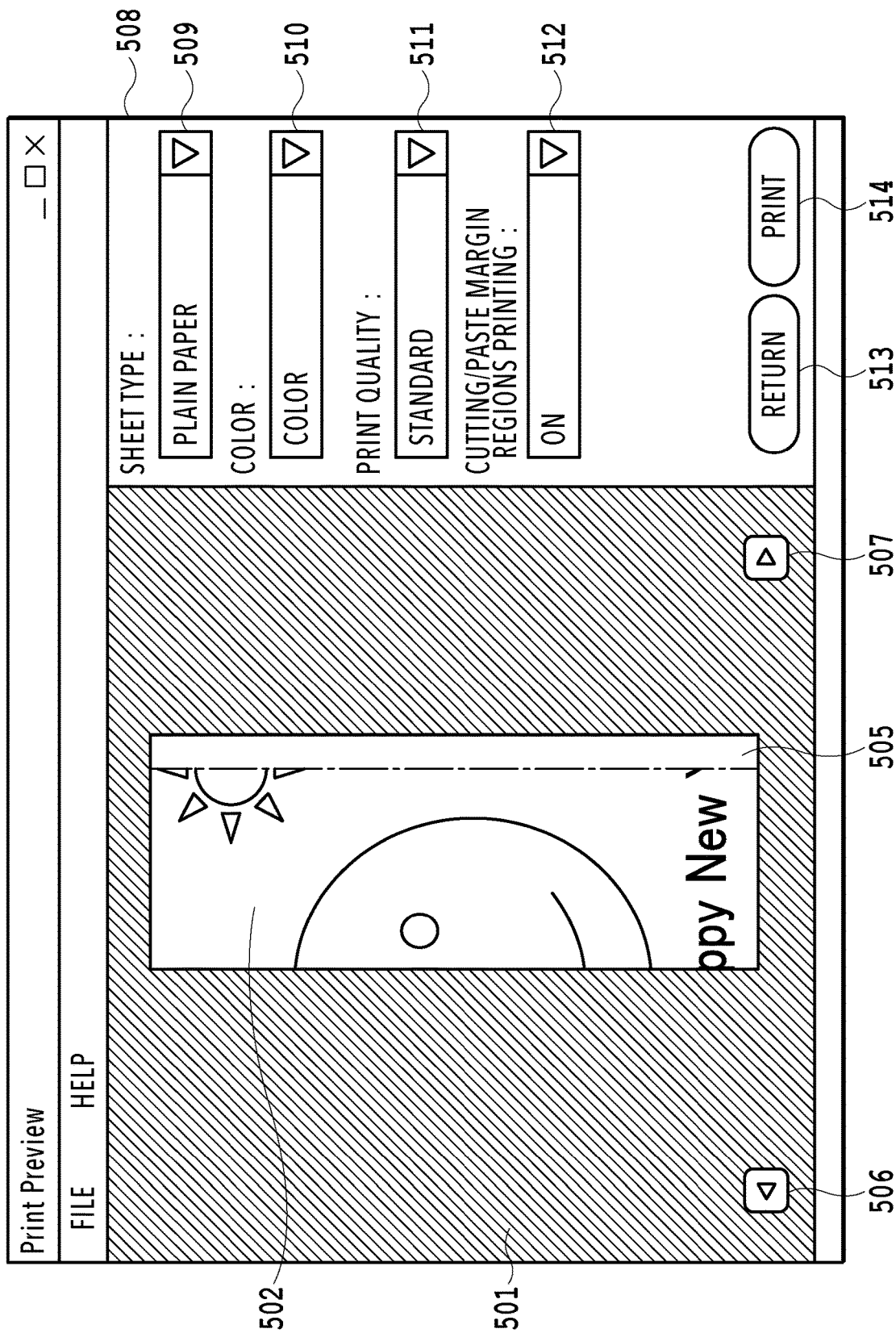
FIG. 8 is a screen switched from the UI screen in FIG. 7 in a case where the next button is pressed.

FIG. 7 is a diagram that illustrates an example of the UI screen of the layout software 104 in a case where the borderless printing setting is on (enabled), and FIG. 8 is a screen switched from the UI screen in FIG. 7 in a case where the next button is pressed. In the case where the borderless printing setting is on, no printing apparatus margin region is provided on the image.

Figure 9:
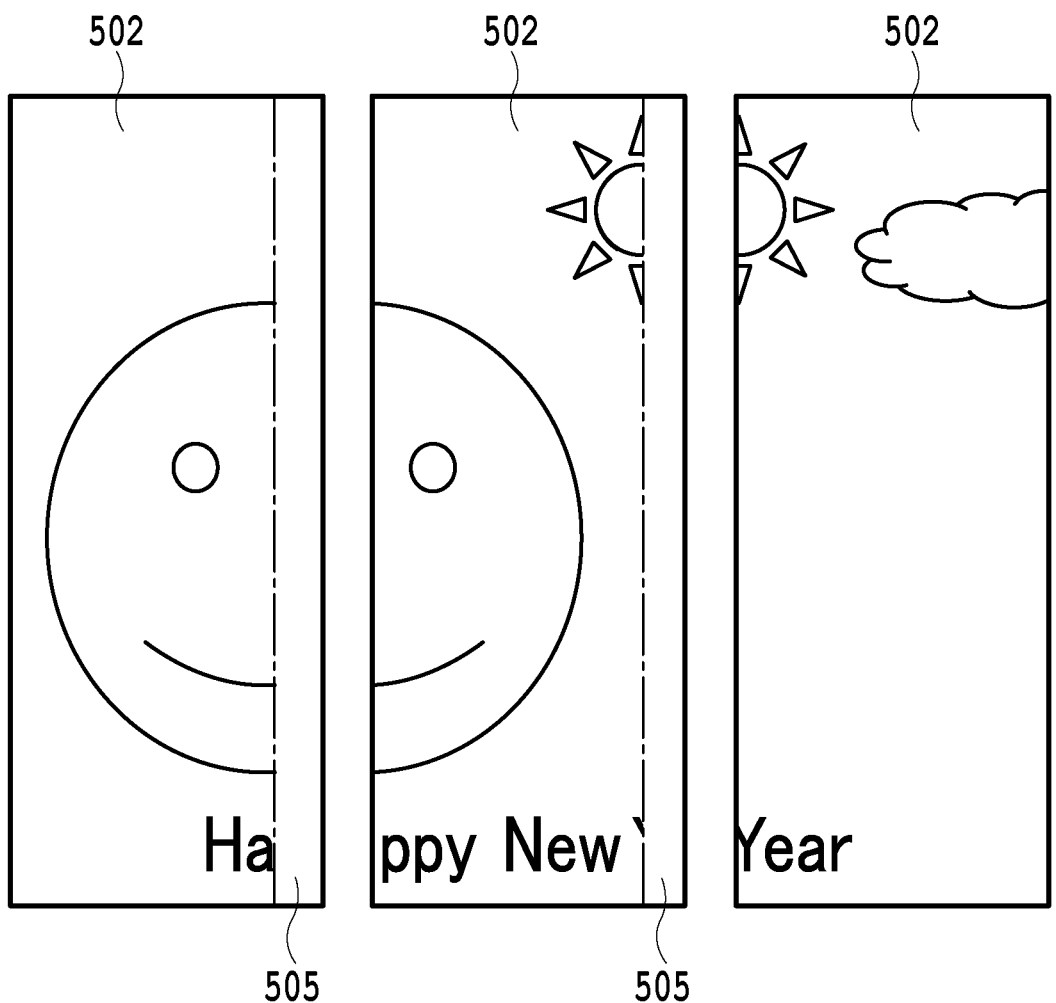
FIG. 9 is a diagram that illustrates printed images of respective pages.

FIG. 9 is a diagram that illustrates printed images of respective pages in a case where the borderless printing setting is set to on and the number of divisions is set to 3. It can be seen that a part of the drawing of each page is overlapped with the previous page in the borderless printing. Since a part of the image is cut off during the printing by the printing apparatus 2 in the case of the borderless printing, parts of the images are overlapped between the pages to prevent the loss of a part of the image.

Figure 10:
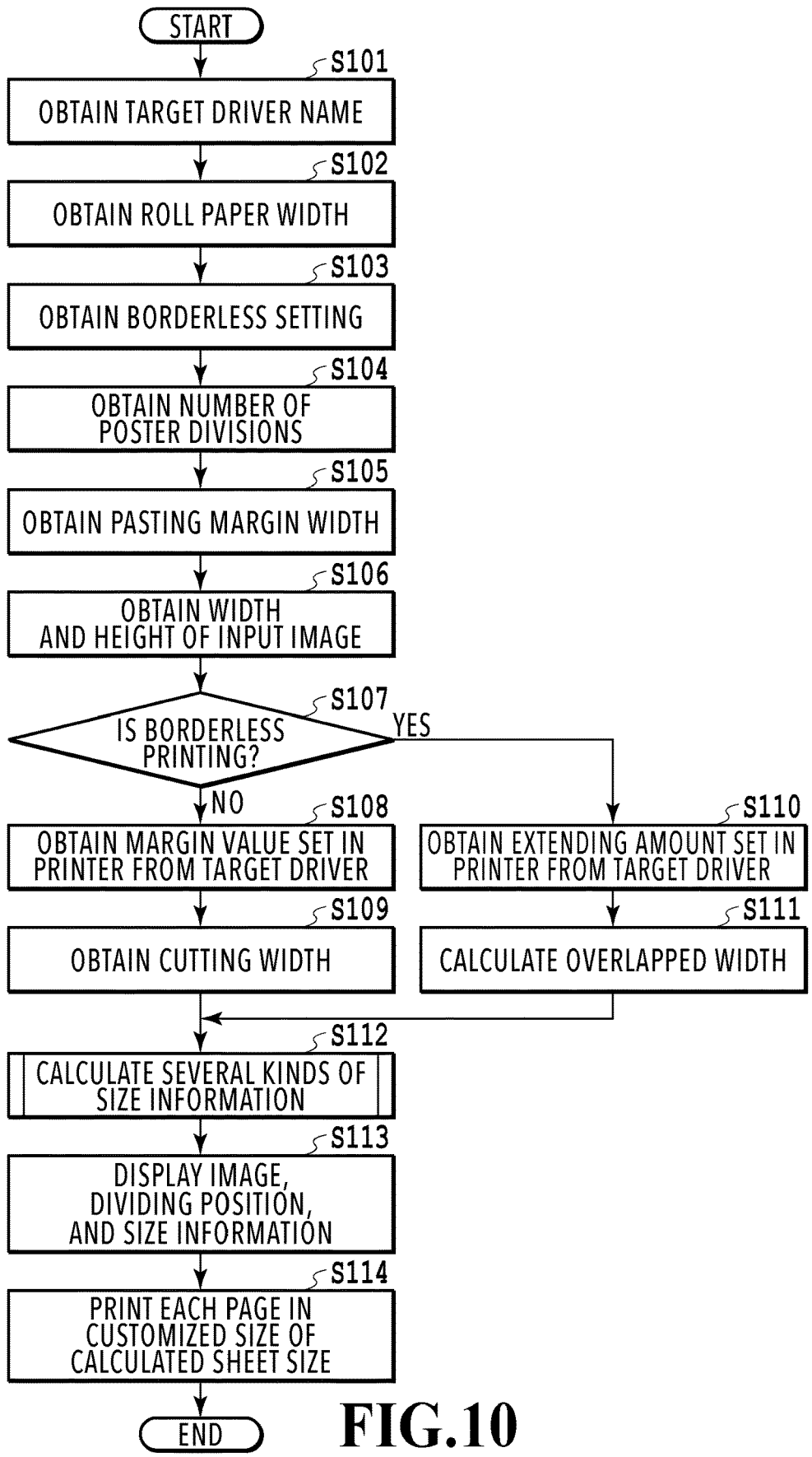
FIG. 10 is a flowchart that illustrates processing of performing poster printing.

FIG. 10 is a flowchart that illustrates processing of the poster printing by the layout software 104 in this embodiment. The processing of the poster printing is described below using this flowchart. In the following processing, the layout software 104 may be described as an actor of the processing; however, actually the CPU 201 executes corresponding programs (programs of the layout software 104) to implement the corresponding functions. All of the processings are not necessarily executed sequentially in one process, and there may be a case where the OS once takes charge of the processing and then the processing is called back from the OS again. The flowchart is merely for conveniently and clearly illustrating the main processing of the layout software 104.

First, in S101, the layout software 104 obtains the name of the target printer driver 105. Thereafter in S102, the layout software 104 obtains a set value set in the roll paper width setting item 406, and in S103, the layout software 104 obtains a set value set in the borderless printing setting item 407. In S104, the layout software 104 obtains a set value set in the number of poster divisions setting item 408, and in S105, the layout software 104 obtains a set value set in the pasting margin width setting item 409.

Thereafter in S106, the layout software 104 obtains width information and height information of the input image, and in S107, the layout software 104 determines whether the borderless printing setting information obtained in S103 is the borderless printing. If it is the borderless printing, the process proceeds to S110, and if it is not the borderless printing, the process proceeds to S108.

In the case where the process proceeds to S108, the printing apparatus margin value is obtained from the printer driver 105 obtained in S101 using an API such as PrintCapabilities. The obtained value is a value of the white space region set in the printing apparatus that is formed inside the sheet, and the value is 3 mm, for example. The printing apparatus margin value may be a constant value such as 10 mm or may be set by the user; however, in these cases, unnecessary white spaces may likely to be formed. If the accurate margin value is obtained from the target printer driver 105 like this embodiment, it is possible to perform printing with no unnecessary white spaces. In S109, the layout software 104 obtains the cutting width (that is a fixed value (15 mm) in this embodiment), and the process proceeds to S112.

In the case where the process proceeds from S107 to S110, in S110, the layout software 104 obtains an amount of extension set in the printing apparatus from the printer driver 105 obtained in S101 using an API such as PrintCapabilities. The obtained value is an amount of extension of the image for making the printing extend beyond the sheet, and the value is 2 mm, for example.

Thereafter in S111, the layout software 104 calculates an overlap width for the borderless printing. In the case of performing the borderless printing in the poster printing, the printing has to be made with parts of the images overlapped between the pages to prevent the loss of the parts of the images between the pages during the borderless printing. The overlap width has to be greater than the amount of extension set in the printing apparatus (e.g., 2 mm). For example, 2 mm of the amount of extension +3 mm of the margin width taking into consideration skewing of the sheet is calculated, and the obtained 5 mm as the total value is the overlap width. With obtaining the amount of extension set in the printing apparatus and calculating the overlap width, the layout software 104 can reduce unnecessary overlap of the images and can accurately calculate the total size of the poster after pasting created by the borderless printing.

For example, with a configuration in which the amount of extension set in the printing apparatus is not obtained, the layout software 104 cannot determine the scale factor of image enlarged by the printer driver and the amount of extension of the image in the borderless printing. In this case, the layout software 104 has to set the overlap width of the image to a great value such as 10 mm to prevent the loss of the images between the pages, and this may cause the images to be excessively overlapped. In addition, since the overlapped regions of the images are unclear, it is impossible to calculate the accurate size and to display the size on the screen.

Thereafter in S112, the layout software 104 calculates several kinds of size information required for the poster printing (details are described below). In S113, the layout software 104 displays the image, dividing position, and image size on the UI screen, and in S114, the layout software 104 prints the image and ends the processing of the poster printing.

Figure 11:
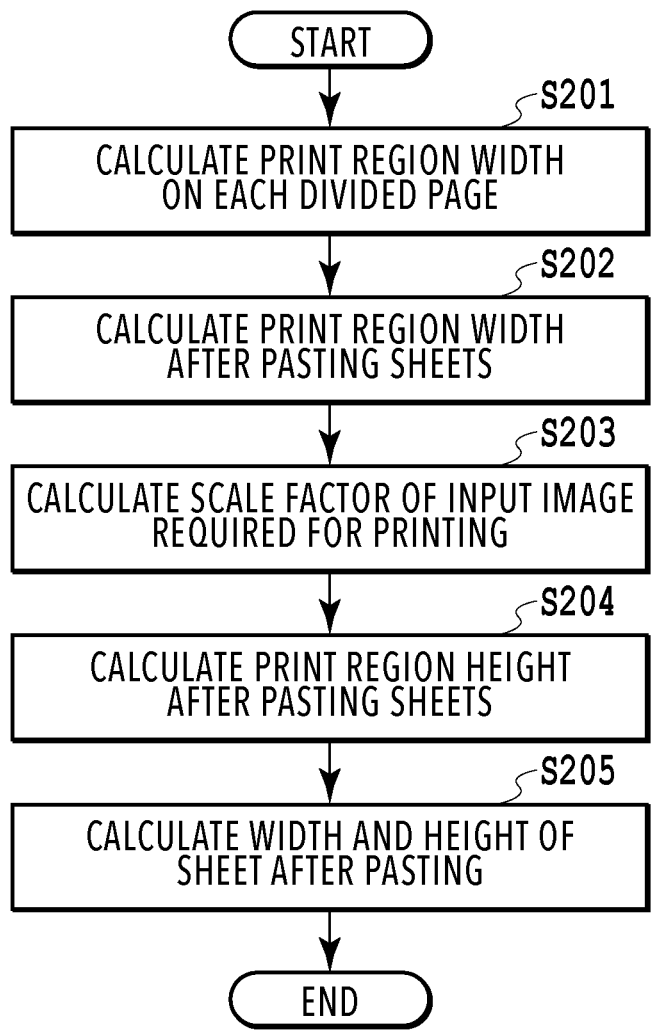
FIG. 11 is a flowchart that illustrates a part of the processing in the flowchart in FIG. 10.

FIG. 11 is a flowchart that illustrates the processing of S112 in the flowchart in FIG. 10. The processing of S112 is described below using this flowchart.

Once the processing of S112 is started, in S201, the layout software 104 calculates the print region width of each divided image, and in S202, the layout software 104 calculates the print region width after pasting sheets. Thereafter in S203, the layout software 104 calculates the scale factor of the input image required for the printing, and in S204, the layout software 104 calculates a print region height after pasting sheets. Then in S205, the layout software 104 calculates a width and height of the sheet of the poster after pasting and ends the processing.

As described above, in this embodiment, the layout software 104 includes the UI screen displaying the entire image with the dividing position by the preview function and the UI screen individually displaying the divided images by the preview function, and it is possible to perform setting of printing on the screens. The UI screens are configured to enable switching of the screens, and the user can go back and forth freely between the screens depending on the settings by the user. This allows the user to efficiently perform the setting of editing and setting of printing while checking the dividing state and pasting margin position of the image to be printed using the preview function provided by the layout software 104 without displaying the setting screen provided by the printer driver again.

In addition, automatic enlargement of the image according to the print region width after pasting sheets makes it possible to perform printing without forming unnecessary white spaces with no image size adjustment by the user.

Hereinafter, the calculation processing in the flowchart of FIG. 11 is described with a specific example. As a case 1, it is assumed to perform the bordered printing with the following values.

setting of borderless printing: off
width of input image (spool file): 400 mm
height of input image (spool file): 300 mm
roll paper width: 500 mm
number of poster divisions: 3
cutting width: 15 mm (fixed value)
pasting margin width: 30 mm
printing apparatus margin: 3 mm A print region width of the first page PageWidth1, a print region width of the second page PageWidth2, and a print region width of the third page PageWidth3 in S201 can be respectively calculated by the following expressions.

PageWidth1=roll paper width−printing apparatus margin on left side−pasting margin width=500−3−30 =467 (mm)

PageWidth2=roll paper width−cutting width−pasting margin width=500−15−30=455 (mm)

PageWidth3=roll paper width−cutting width−printing apparatus margin on right side=500−15−3=482 (mm)

Next, a print region width after pasting sheets PosterImageWidth in S202 can be calculated by the following expression.

PosterImageWidth=PageWidth1+PageWidth2×the number of middle pages+PageWidth3=467+455×1+482=1404 (mm)

Next, a scale factor of the input image Ratio in S203 can be calculated by the following expression based on the ratio of the width of the input image and the print region width after pasting sheets.

Ratio=PosterImageWidth/width of input image=1404/400=3.51

Next, a print region height after pasting sheets PosterImageHeight in S204 can be calculated by the following expression based on the previously calculated scale factor of the image.

PosterImageHeight=height of input image×Ratio=300×3.51=1053 (mm)

Next, a width PosterWidth and a height PosterHeight of the sheet of the poster after pasting in S205 can be calculated by the following expression by adding the printing apparatus margins respectively.

PosterWidth=PosterImageWidth+top and bottom printing apparatus margins=1404+3×2=1410 (mm)

PosterHeight=PosterImageHeight+top and bottom printing apparatus margins=1053+3×2=1059 (mm)

The values can be calculated in this way.

Next, as a case 2, it is assumed to perform the borderless printing with the following values.

setting of borderless printing: on
width of input image (spool file): 400 mm
height of input image (spool file): 300 mm
roll paper width: 500 mm
number of poster divisions: 3
pasting margin width: 30 mm
amount of extension set in printing apparatus: 2 mm
overlap width: 5 mm Each of print region widths of the first and second pages (pages other than the last page) PageWidth1 and a print region width of the third page (last page) PageWidth2 in S201 can be respectively calculated by the following expressions.

PageWidth1=roll paper width+amount of extension set in printing apparatus of left side−pasting margin width=500+2−30=472 (mm)

PageWidth2=roll paper width+amount of extension set in printing apparatus of left and right sides=500+2×2=504 (mm)

Next, a print region width after pasting sheets PosterImageWidth in S202 can be calculated by the following expression.

PosterImageWidth=(PageWidth1−overlap width)×the number of pages other than last page+PageWidth2=(472−5)×2+504=1438 (mm)

The overlap width is subtracted in the above expression because the overlapped region is hidden under the sheet of the poster during pasting.

Next, a scale factor of the input image Ratio in S203 can be calculated by the following expression based on the ratio of the width of the input image and the print region width after pasting sheets.

Ratio=PosterImageWidth/width of input image=1438/400=3.595

Next, a print region height after pasting sheets PosterImageHeight in S204 can be calculated by the following expression based on the previously calculated scale factor of the image.

PosterImageHeight=height of input image×Ratio=300×3.595=1078.5 (mm)

At last, a width PosterWidth and a height PosterHeight of the sheet of the poster after pasting in S205 can be calculated by the following expression by subtracting the amounts of extension set in the printing apparatus respectively.

PosterWidth=PosterImageWidth−top and bottom amounts of extension set in printing apparatus=1438−2×2=1434 (mm)

PosterHeight=PosterImageHeight−top and bottom amounts of extension set in printing apparatus=1078.5−2×2=1074.5 (mm)

The values can be calculated in this way.

After the values are calculated in S112 as described above, the process proceeds to S113. As described above, in S113, the image, dividing position, and image size are displayed on the UI screen. In specific, based on the several kinds of information determined in the previous processing, the regions 402 and 403, dividing line 404, poster total size display region 410, and regions 502 to 505 display the results.

The display region 402 displays a result of the enlarged input image based on the width and height of the print region after pasting sheets calculated in S202 and S204. In the case of the borderless printing, the size added with the amount of extension set in the printing apparatus is directly displayed; however, it is also possible to, for example, express the amount of extension translucently or not display the amount of extension, and they are not intended to particularly limit the present invention. The printing apparatus margin region 403 displays the white space region based on the printing apparatus margin value obtained in S108. The dividing line 404 displays the dividing line 404 based on the information of the print region width on each page calculated in S201.

In the case of the bordered printing, the print region width on each page obtained in S201 is directly used as the boundary position. Two boundaries are set in the example of the above-described case 1: a first boundary is set at a position at a distance of the print region width on the first page from the left end of the region 402 to the right; and a second boundary is set at a position at a distance of the print region width on the second page from the position of the first boundary to the right. In the case of the borderless printing, the overlapped region has to be taken into consideration; thus, for example, a value obtained by subtracting the overlap width from the print region width on a page other than the last page may be used as the boundary position. In the example of the above-described case 2, a first boundary is set at a position at a distance, which is obtained by subtracting the overlap width from the print region width on the first page, from the left end of the region 402 to the right. Then, a second boundary is set at a position at a distance, which is obtained by subtracting the overlap width from the print region width on the second page, from the position of the first boundary to the right.

The poster total size display region 410 displays the width information and height information of the sheet of the poster after pasting calculated in S205. The display region 502 displays a part of the input image multiplied by the scale factor calculated in S203 corresponding to the print region width on each page calculated in S201. The printing apparatus margin region 503, the cutting region 504, and the pasting margin region 505 display the white space regions based on the values obtained in S108, S109, and S105, respectively.

The size used for the printing is a customized size in which the width is the roll paper width and the height is the sheet height calculated in S205. The customized size can be used for the printing by registering the customized size in the printer driver using a software development kit (SDK) of the printer driver 105. As another way for using the customized size, a standard mechanism for setting a customized size in the printer driver may be used. However, the standard mechanism may have an upper limit of the size. The number of printed pages is determined based on the number of poster divisions obtained in S104. The print data is created and arranged as illustrated in FIGS. 6 and 9 directly using the previously obtained drawing information of the regions 502 to 505. The pieces of print setting information of the items 407 and 509 to 511 are also reflected as the print setting. In the borderless printing, data that is larger than the sheet size is used for the printing, and actually, a region extending beyond the sheet size is printed on a platen of the printing apparatus 2, and the sheet size on which the printing is made to its page edge is the final product.

In this embodiment, the embodiment using the roll paper is described; however, for example, cut sheets of paper in a size customized for the poster printing may be prepared and used for the printing, and the present invention is not limited to the roll paper. In this embodiment, the embodiment in which an image of the actual print target is displayed on the screen for setting of the poster printing is described; however, the present invention is not limited thereto, and a configuration in which a simple image for preview is displayed on the screen may be applied, for example.

As described above, the layout software 104 of this embodiment allows the user to set the number of divisions of the image. Thus, the layout software 104 can obtain the width of the print region of each divided image based on at least the set number of divisions and sheet width. Once the width of the print region of the divided image is obtained, the dividing position of the image can be obtained. This makes it possible to display the guide information indicating the dividing position on the print preview of the input image. In addition, in this embodiment, since the width of the print region of the divided image is obtained based on the set number of divisions and sheet width, it is possible to efficiently perform setting of the print region without forming unnecessary white spaces on the sheet supplied to the printing apparatus.

The layout software 104 is configured to be able to perform setting of image editing on the UI screen displaying the image with the dividing position by the preview function. This allows the user to efficiently perform resetting of the poster printing.

Second Embodiment

Hereinafter, a second embodiment of the present invention is described. The basic configuration of this embodiment is similar to that of the first embodiment; thus, only the characteristic configurations are described below.

The object of the present invention also can be achieved by supplying a storage medium storing program code of software that implements the functions of the above-described embodiment to a system or an apparatus and by using a computer (or CPU or MPU) of the system or the apparatus to read and execute the program code stored in the medium. In this case, the program code itself read from the storage medium implements the functions of the above-described embodiment, and the storage medium storing the program code constitutes the present invention.

For example, a flexible disk, hard disk, optical disk, magneto optical disk, CD-ROM, CD-R, magnetic tape, non-volatile memory card, ROM, DVD, and so on may be used as the storage medium for supplying the program code.

The functions of the above-described embodiment are not implemented only by executing the program code read by the computer. That is, there also may be a case where an operating system and the like operating on the computer performs a part of or all the actual processings based on the instruction of the program code to implement the functions of the above-described embodiment by the processings.

In addition, there also may be a case where, after the program code read from the storage medium is written in a memory provided in a function expansion board inserted in the computer or a function expansion unit connected to the computer, the functions of the above-described embodiment are implemented by performing the actual processings based on the instruction of the program code. There also may be a case where a CPU provided in the function expansion board or unit performs a part of the actual processings to implement the functions of the above-described embodiment by the processings Other Embodiments Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-099928 filed May 24, 2018, which is hereby incorporated by reference wherein in its entirety.

What is claimed is:

1. A control apparatus comprising:
at least one processor causing the control apparatus to act as:
(1) an image obtaining unit that obtains an input image;
(2) a display control unit that causes a display unit to display an editing setting screen including a first setting item that allows a user to designate a number of divisions without user operation to the input image;
(3) a setting unit that sets the number of divisions of the input image based on the number of divisions designated by the user using the first setting item;
(4) an obtaining unit that obtains a width of a sheet;
(5) a first determining unit that determines, based on at least the obtained width of the sheet, a print region width of each of divided images to be obtained by dividing the input image according to the set number of divisions;
(6) a second determining unit that determines a scale factor for expanding the input image, based on a ratio between (a) a total width of the print region widths of the divided images and (b) a width of the input image; and
(7) an editing unit that performs edit processing including expanding and dividing of the input image based on (a) the scale factor and (b) the set number of divisions,
wherein the display control unit is able to cause the display unit to display, concurrently, (a) a print preview of the input image on which guide information indicating a dividing position of the input image is displayed based on the set number of divisions and (b) the editing setting screen,
wherein the display control unit is further able to cause the display unit to display an individual print preview for each of the divided images, and
wherein a pasting margin is not displayed with the input image on the print preview, and a pasting margin is displayed with the divided image on the individual print preview.

2. The control apparatus according to claim 1, wherein the obtaining unit obtains a margin value set in a printing apparatus, and
wherein the first determining unit determines the print region width of the divided image based on at least (a) the width of the sheet and (b) the obtained margin value.

3. The control apparatus according to claim 1, wherein the setting unit is capable of setting whether to enable or disable borderless printing setting based on user input through a borderless printing setting item for setting whether to perform borderless printing provided on the editing setting screen,
wherein the obtaining unit obtains an amount of extension set in a printing apparatus in a case where the borderless printing setting is enabled, and
wherein the first determining unit determines the print region width of the divided image based on (a) the width of the sheet and (b) the set amount of extension.

4. The control apparatus according to claim 1, wherein the setting unit is capable of setting a pasting margin width based on user input through a pasting margin width setting item for setting a pasting margin width provided on the editing setting screen, and
wherein the first determining unit determines the print region width of the divided image based on (a) the width of the sheet and (b) the set pasting margin width.

5. The control apparatus according to claim 1, wherein the display control unit causes the display unit to display, on the editing setting screen, an estimate value of a total size of images on a pasted sheet on which the input image is dividedly printed.

6. The control apparatus according to claim 1, wherein the display control unit is able to change from the print preview of the input image to the individual print preview of the divided image.

7. The control apparatus according to claim 1, wherein the input image is intermediate data in a predetermined format that is generated based on drawing data generated by a drawing application.

8. The control apparatus according to claim 1, wherein the second determining unit determines the scale factor for expanding the input image in the sheet after printing.

9. The control apparatus according to claim 1, wherein the obtaining unit obtains a width of a roll sheet as the width of the sheet.

10. A control method comprising steps of:
obtaining an input image;
causing a display unit to display an editing setting screen including a first setting item that allows a user to designate a number of divisions without user operation to the input image;
setting the number of divisions of the input image based on the number of divisions designated by the user using the first setting item;
obtaining a width of a sheet;
determining, based on at least the obtained width of the sheet, a print region width of each of divided images to be obtained by dividing the input image according to the set number of divisions;
determining a scale factor for expanding the input image, based on a ratio between (a) a total width of the print region widths of the divided images and (b) a width of the input image; and
performing edit processing including expanding and dividing of the input image based on (a) the scale factor and (b) the set number of divisions,
wherein the display unit is caused to display, concurrently, (a) a print preview of the input image on which guide information indicating a dividing position of the input image is displayed based on the set number of divisions and (b) the editing setting screen,
wherein the display unit is caused to display an individual print preview for each of the divided images, and
wherein a pasting margin is not displayed with the input image on the print preview, and a pasting margin is displayed with the divided image on the individual print preview.

11. The control method according to claim 10, wherein a margin value set in a printing apparatus is obtained, and
wherein the print region width of the divided image is determined based on at least (a) the width of the sheet and (b) the obtained margin value.

12. The control method according to claim 10, wherein whether to enable or disable borderless printing setting is set based on user input through a borderless printing setting item for setting whether to perform borderless printing provided on the editing setting screen,
wherein an amount of extension set in a printing apparatus is obtained in a case where the borderless printing setting is enabled, and
wherein the print region width of the divided image is determined based on (a) the width of the sheet and (b) the set amount of extension.

13. The control method according to claim 10, wherein a pasting margin width is set based on user input through a pasting margin width setting item for setting a pasting margin width provided on the editing setting screen, and
wherein the print region width of the divided image is determined based on (a) the width of the sheet and (b) the set pasting margin width.

14. The control method according to claim 10, wherein an estimate value of a total size of images on a pasted print sheet on which the input image is dividedly printed is displayed on the editing setting screen.

15. The control method according to claim 10, wherein a change can be made from the print preview of the input image to the individual print preview of the divided image.

16. The control method according to claim 10, wherein the input image is intermediate data in a predetermined format that is generated based on drawing data generated by a drawing application.

17. A non-transitory computer-readable storage medium storing a program for causing a computer to perform the steps of a control method, the control method comprising steps of:
obtaining an input image;
causing a display unit to display an editing setting screen including a first setting item that allows a user to designate a number of divisions without user operation to the input image;
setting the number of divisions of the input image based on the number of divisions designated by the user;
obtaining a width of a sheet;
determining, based on at least the obtained width of the sheet, a print region width of each of divided images to be obtained by dividing the input image according to the set number of divisions;
determining a scale factor for expanding the input image, based on a ratio between (a) a total width of the print region widths of the divided images and (b) a width of the input image; and
performing edit processing including expanding and dividing of the input image based on (a) the scale factor and (b) the set number of divisions,
wherein the display unit is caused to display, concurrently, (a) a print preview of the input image on which guide information indicating a dividing position of the input image is displayed based on the set number of divisions and (b) the editing setting screen,
wherein the display unit is caused to display an individual print preview for each of the divided images, and
wherein a pasting margin is not displayed with the input image on the print preview, and a pasting margin is displayed with the divided image on the individual print preview.

* * * * *